Inventors
HANS KLUGE
ERHARD FISCHER
By Toulmin & Toulmin
Attorneys

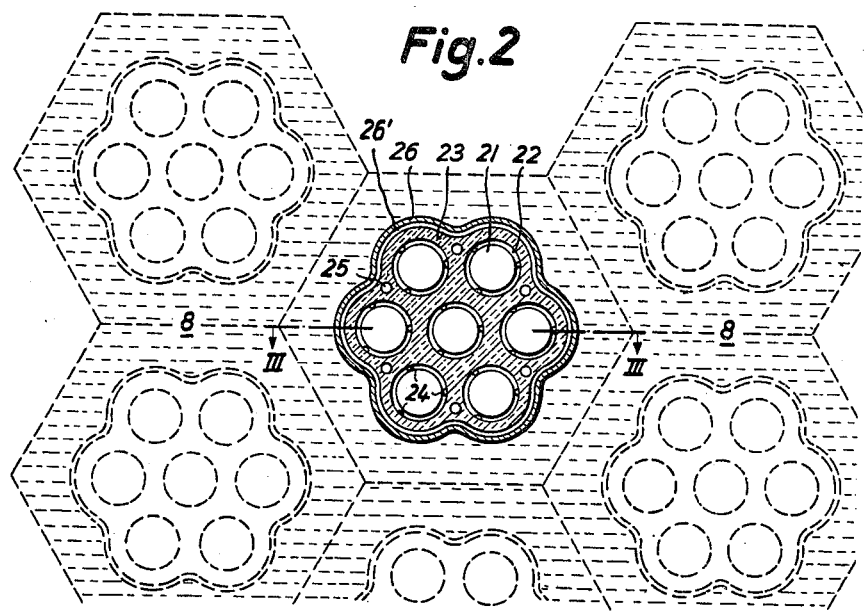
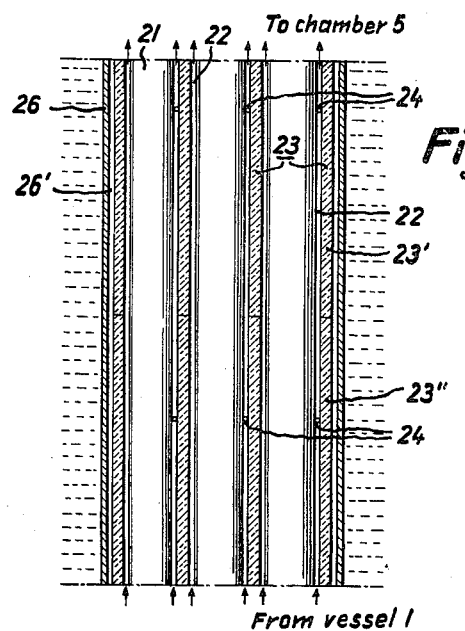

United States Patent Office 3,206,372
Patented Sept. 14, 1965

3,206,372
BOILING WATER NUCLEAR REACTOR PRODUCING SUPERHEATED STEAM
Hans Kluge and Erhard Fischer, Frankfurt am Main, Germany, assignors to Licentia Patent-Verwaltungs-G.m.b.H., Frankfurt am Main, Germany
Filed Feb. 13, 1961, Ser. No. 88,939
Claims priority, application Germany, Feb. 12, 1960, L 35,339
6 Claims. (Cl. 176—54)

The present invention relates to a nuclear reactor which can be considered a combination of a boiling water reactor and of a pressure reactor.

It is an object of the present invention to devise a reactor having a simple overall structure and a very high power output and satisfactory steam-operating-condition.

It is another object of the present invention to provide a new reactor core element designed particularly with respect to the heat exchange process.

It is a further object of the present invention to provide a new and improved nuclear reactor with light water as moderator as well as a heat exchange medium.

There are known several suggestions to produce superheated water vapor in a boiling water reactor. The disadvantages of known suggestions along this line reside primarily in the fact that either a second unit is required as actual superheater, or that in a boiling water reactor constructed so as to have incorporated a super-heater, the water has to pass through the reactor core several times in different i. e. opposite directions.

The presently known boiling water reactors are relatively simply constructed if used for the production of saturated vapor. However, the boiling moderator presents difficulties in view of certain neutron physics conditions; the vapor bubbles disturb the homogeneous condition of the moderator in a relatively unorganized and uncontrollable fashion.

It is a feature of the present invention to devise a reactor so that it has a vaporizing chamber spatially and operatively separated from the moderator tank. In view of this separation one obtains the advantage that the produced saturated vapor can be overheated by means of the same fuel elements.

It is another feature of the present invention to devise a structure for a water cooled and water-moderator reactor in which saturated vapor is produced and later on overheated; the cooling medium i.e. the water passes through the several heat exchange channels of the reactor core only once, in one direction whereby preheating, vaporizing and superheating is obtained successively but during passing in but one direction.

While the specification concludes with the claims particularly pointing out and distinctly claiming the subject matter which is regarded as the invention it is believed that the features and objects of the invention and further features, objects and advantages thereof will be better understood from the following description taken in connection with the accompanying drawing, in which:

FIGURE 2 is a cross section through several fuel elements to be used in a reactor as shown in FIG. 1; and FIGURE 3 is a longtitudinal section through one fuel element taken along line III—III as illustrated in FIG. 2.

Figure 1:
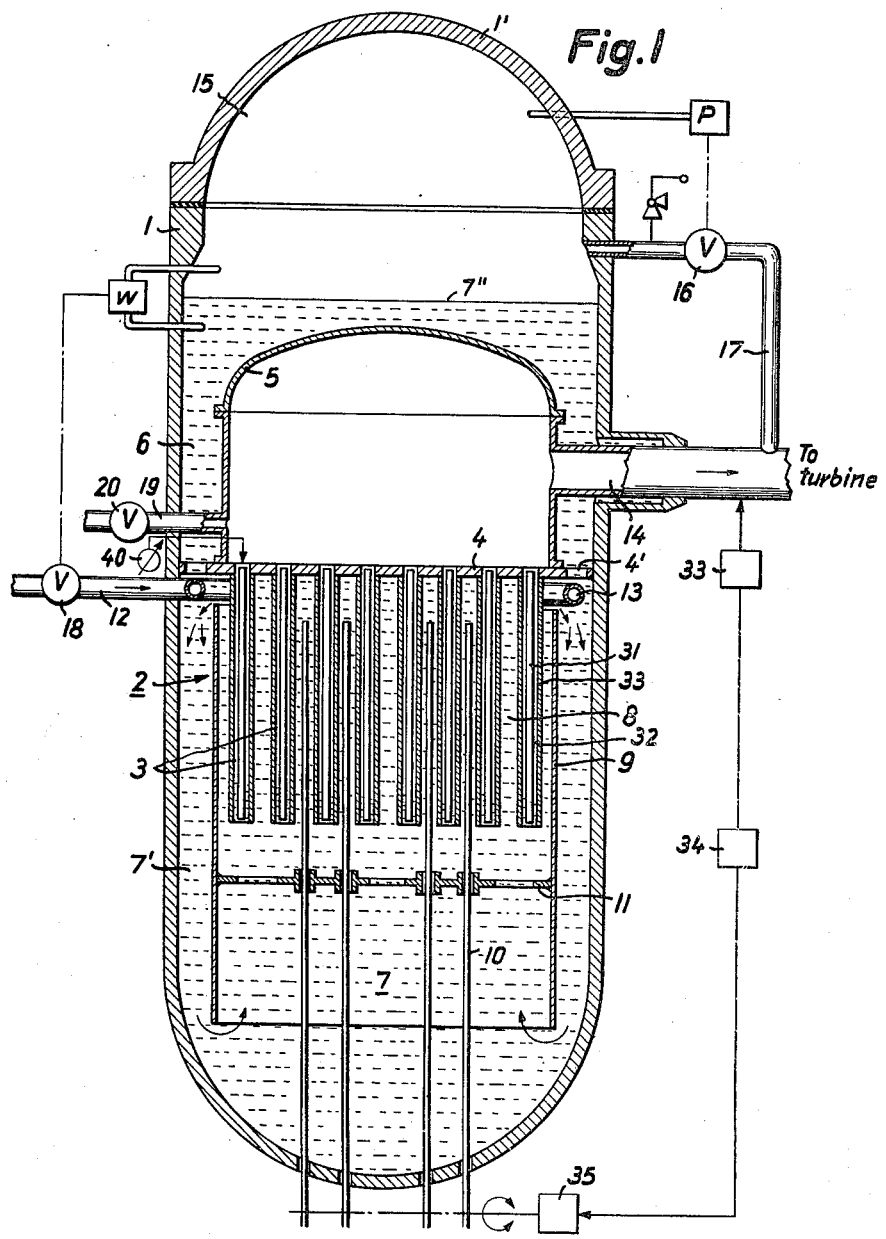
FIGURE 1 is a cross section through the reactor in accordance to the present invention.

Turning now to the detailed description of the drawings, particularly of FIG. 1, there is shown a reactor housing being devised as a standing cylindrical pressure vessel having an opening closing its top by a lid 1', screwed on the housing 1. The pressure vessel 1 will be mounted on the ground in any suitable manner which is not part of the present invention.

A reactor core 2, in general, comprises a large number of reactor core elements 3 secured to a reactor plate 4, each reactor core element basically is comprised of a tube 33 enclosing a fuel rod 31 and having a space 32. These elements 31 and 33 are only shown schematically in this FIG. 1, and their preferable structure will be shown and described in detail in connection with FIG. 2 and FIG. 3. Briefly, however, it should be mentioned at this point, that there is a casing such as tube 33 secured with its upper portion to the reactor plate 4 having corresponding openings so that the space above plate 4 communicates with the interior of tube 33. Furthermore, in tube 33 is disposed some kind of fuel rod structure so that vaporizing channels such as 32 are defined between the inner tube wall and the rod therein. The securing of tubes 33 to plate 4 is carried out so that a complete air and watertight connection is obtained. The fuel channels 3, i.e. the tubes 33 are open at their bottom. There are provided screens for placing these tubes 33 in a proper position and for keeping them in a predetermined lateral relationship. These screens are designed so that the tubes can move downwardly under the influence of thermal expansion. In between the tube 33 and the fuel rod 31 there may be provided a ceramic spacer and thermal insulator; this feature will also be explained more in detail in connection with FIGS. 2 and 3; at the present, this ceramic spacer can be understood as being part of the tubing 33.

The reactor plate 4 supports the entire weight or load of the reactor core consisting of rods, ceramic filling members and tubes or pipes. Reactor plate 4 is supported inside of pressure vessel 1 by means of laterally disposed rims or sashes. The supporting structure for reactor plate 4 is devised so that this plate together with all elements mechanically connected thereto can be lifted from the reactor pressure vessel after the lid 1' has been removed, of course.

Also supported by plate 4 is a vapor dome chamber 5 for superheated vapor to collect therein. Dome 5 has also a removable lid screwed on the main body of this dome chamber or connected thereto in any other suitable manner. The dome chamber 5 communicates with channels 32.

There is provided a space 6 between the outer surface of dome 5 and the inner wall of reactor vessel 1 which space has a width of approximately 20 cm. The reactor plate 4 has some axially directed openings such as 4' so that the spacing 6 can communicate with the moderator-cooling medium 7, which is preferably water. The moderator space 8 within the reactor core structure is served with water from the returning ring channel 7' directly communicating with space 6 via the opening 4'. The separation of ring channel 7' and moderator space 8 is carried out by means of a hollow guiding cylinder denoted as reference numeral 9. Moderator space 8 and ring channel 7' communicate at top and bottom of cylinder 9.

Reference numeral 10 denotes the control rods leading into the moderator space 8 from the bottom of vessel 1, inside of cylinder 9. These rods 10 are placed in proper position, laterally, by means of a guiding screen 11 secured to cylinder 9.

The moderator-cooler water is fed to the reactor at 200° C., for example, via a feeding pipe 12 controlled by a valve 18, and it passes into the lower portion of the reactor vessel 1 via a distributor ring 13 having circumferentially disposed discharge openings (not shown). It will be observed that the openings of distributor ring 13 and the ring itself is positioned so that the feeding water from pipe line 12 is mixed directly with the water returning from the moderator room into the outer channel 7' at the top of cylinder 9. The water fed from the pipe 12 into the reactor vessel room is thereby heated up to about 250° C. This final temperature, of course, depends on the particular speed of circulation of the water in vessel 1, and the final mixing temperature of the water also depends on any heat losses. The circulation of the cooling water as moderator is to be adjusted so that even in case there is present only a partial load, the moderator in space 8 will not boil. The particular arrangement as disclosed has the advantage that the natural circulation of the moderator and the mixing of fresh cooling medium coming from pipe line 12 with the already present moderator does not require a separate moderator and a separate cooling i.e. no separate tanks are necessary. However in special cases it might be of advantage to have an additional moderator tank in case one wishes to use heavy water as a moderator.

The same quantity of water which is passed into the vessel via the pipe line 12 also passes through the ring channels 32 and is heated therein up to boiling temperature and above, and it is vaporized still within the area around the rods. In the upper portion of the channels 32, the moderator-cooling-water vapor is superheated and the superheated steam or vapor is collected in dome 5 above plate 4. There is provided a special outlet channel 14 positioned so as to prevent the superheated vapor in dome 5 from touching the reactor vessel wall. From pipe 14 the superheated steam passes into a turbine (not shown).

The reactor vessel 1 is by itself in direct connection only with saturated water vapor in the area denoted in general with reference numeral 15 below lid 1. Therefore, the particular wall of vessel 1 and lid 1' needs only to withstand the temperature of saturated vapor. The pressure loss in channels 32 is about five atmospheres at full load. The necessary pressure drop or pressure gradient for producing a natural flow of moderator medium through the channels 32 is obtained in that the saturated water vapor in pressure chamber 15 is kept at such a high pressure so that there is a sufficient pressure difference between the chambers 15 and 5 pressing such vapor into this superheater vapor chamber 5.

The reactor vessel is filled with moderator water so that the dome or chamber 5 in itself appears to be immersed therein. This chamber 15 is positioned readily above chamber 5 with the water level 7" in vessel 1 appearing in between. It has been found to be of advantage to operate in chamber 15 at a pressure of about 80 atmospheres of the saturated water vapor therein. The pressure in chamber 15 is produced in selecting the heat-insulation of dome 5 so that all heat passing through the wall of chamber 5 heats the surrounding water, and under consideration of all other heat losses and of the insulation of pressure vessel 1 itself and lid 1', one will maintain a boiling condition at 80 atmospheres in chamber 15 and at surface level 7".

There is provided a pressure regulator P sensing the pressure in chamber 15; if the pressure therein increases too much, superfluous vapor will pass into a line 17 in that the regulator P opens a control valve 16 having an inlet communicating with chamber 15. Pipe line 17 terminates in pipe line 14 feeding a turbine.

It has been found that the amount of water vapor passing through channel 17 is about $\frac{1}{1000}$ of the amount of water vapor produced in toto.

A control valve 18 is acted upon by a water surface level regulator W of any known design, acting upon the control valve 18 so that the free upper water level 7" below the saturated vapor in chamber 15 remains constant; in other words, the volume of chamber 15 is kept constant.

In pre-selecting the pressure in chamber 15 of the saturated water above the level 7" the operating pressure of the entire system is determined thereby. The amount of water passing through the reactor then is determined automatically under consideration of the pressure difference between the pressure in chamber 15 and the pressure in line 14 right in front of the entrance to the turbine.

In case of a reduced power requirement of the turbine, the amount of vapor passing through pipe 14 will be throttled. Accordingly, the pressure in this line 14 and in chamber 5 will increase. The pressure of the saturated vapor in chamber 15 is kept constant by regulator P; thence the driving or operating pressure drop for driving the reactor is reduced (pressure in pressure chamber 15 minus pressure in vapor chamber 5). Consequently, a lesser amount of water will pass through the channels 32. Accordingly, the amount of water required for a continued operation is also throttled and this is carried out automatically by the water level regulator W. In other words whenever the amount of vapor passing into the turbine is throttled in blocking partly the passage of vapor through the line 14, the production of vapor is automatically reduced without requiring any additional control elements.

Of course, if the control rods 10 are maintained in their position, the reactor produces more energy as discharged through pipe 14, and as it would be necessary to maintain the energy level because the power requirement has been reduced. Thus, if the line 14 is throttled, the temperature of the superheated vapor in dome chamber 5 will be heated up to a higher temperature. The temperature of the superheated water vapor can therefore be used to adjust and control the position of the control rods 10. For this purpose there is provided a temperature sensitive element 33 of any suitable design, heat conductively connected to the water vapor of chamber 5 or conduit 14. The temperature sensing element 33 produces an output, for example, a voltage or a current indicative of the temperature in pipe 14; this voltage or current is amplified in an electric amplifier 34, and then it is used to drive a motor of any type, 35, having its rotary output geared in any suitable manner to the rods 10 so as to longitudinally control the position of the rods 10 and to move them within the moderator room or space 8. The control rods 10 will be moved forward, of course, for reducing the produced heat energy until, for example, the operating temperature of 500° C. at the sensing point has been reached again.

Of course, the automatic energy level control operates with an inherent time delay; i.e. when a particular excessive temperature is sensed by temperature sensitive element 33, several seconds will elapse until the temperature or the heat energy passing from the fuel elements into the cooling system has been reduced. To avoid this delay, preferably the mechanical throttling of the vapor supply for the turbine is carried out simultaneously with a coarse adjustment of the control rods, or, for example, if the generator and the electric generator driven by the turbine is controlled so as to reduce its power output, this reduction can simultaneously be used to coarsely adjust the position of the control rods, and the control circuit as composed of the elements 33, 34 and 35 only is used for the fine adjustment of the energy level of the reactor.

The moderator-water, of course, vaporizes completely in channels 32; therefore, even in the case of very pure water, there still is dissolved therein some salt, which salt will be deposited at the walls of channels 32 when the water vapor passes through. If the steam is moving fairly fast, the deposited salt will be torn away again and whirled upward into the dome chamber 5. In spite of this "automatic" salt removing action by the steam itself, there will still remain on the walls of channels 32 some deposits of salt, and it is apparent that these salt deposits may reach undue thickness so that the energy transfer, i.e. the heat transfer from the fuel rods to the moderator-cooling-water is rapidly decreased. Therefore, the wall temperature of the control rods and of the tubular casing around them will increase unduly. Accordingly means have to be devised in order to remove such deposits after certain periods of time.

One has to consider that the deposits are water soluble. Those minerals in the water which are insoluble therein can easily be removed by means of a mechanical filter disposed in feeder line 12 before the water enters the reactor vessel. Therefore only water-soluble deposits are to be removed. The best method for such removal is to flush the channels with pure water without vaporization thereof.

For the purpose of cleaning by flushing, the output level of the reactor is first drastically reduced so that no or little vapor is produced in channels 32 until the water in them reaches the height of an overflow stub 19 but reaches into the dome chamber 5. In the instant case, the channels 32 are so small that the flushing can be carried out without the danger of an undue increase of nuclear reactions. The water still boils sufficiently easily.

The saturated water is passed into a main condensator. The pressure of the reactor is controlled by means of a vapor outlet valve.

The flushing water after having reached stud 19 is then passed through a valve 20 into a cleaning device. After sufficient flushing, the flush water has again obtained a desired purity and valve 20 is closed. The water still remaining in dome chamber 5 and in the upper part of channels 32 slowly vaporizes until the pressure and the temperature of the vapor in the dome chamber 5 has again reached the operating equilibrium level. It will be apparent, that the initial starting of the reactor from the cold state is carried out in a manner similar to the starting after cleaning as described.

Utmost purity of the cooling and moderating water is an essential condition for a reactor of the type as disclosed. This can be made possible in view of the utilization of stainless steel in places where the water contacts a structure and in view of a very careful dressing of the water. Special constructive features in the turbine driven by and from the reactor and the avoidance of conventional types of pre-heaters facilitate the operation with a very pure and clean moderator water for a very long period of time.

In case all these conditions are present but a conventional type of pre-heater is required, it has been found that about half of the corrosion products passing into the reactor by means of the cooling-moderator-water comes from a conventional type of pipe-preheater. Therefore, it is necessary that no such pre-heater is used but is substituted by mixing type pre-heater. If such mixing type pre-heater is partially filled with an adsorbing substance for precipitating corrosion products, the moderator-cooling water will have the desired degree of purity.

The narrow channels 32 offer the opportunity to install a continuing measuring device determining the degree of clogging of the walls surrounding every channel. The thickness of the corrosion product layer reduces the cross-section offered for passage to the vapor and the water; therefore, the amount of water and vapor passing therethrough is reduced. Accordingly, at a continued power output level of the reactor, the temperature of the vapor discharge from the channels 32 into dome chamber 5 becomes higher when the cross section is reduced as stated. Therefore, if one measures intermittently or continuously the temperature of the vapor when passing into dome chamber 5, one obtains an indication for the degree with which deposits narrow the channels 32. The measuring device 40 illustrates this schematically.

There are certain requirements to be fulfilled by the various control elements, particularly by the control rods and by the cooling channels because these elements combine in themselves the function of actually three types of reactors.

It has to be considered that there is a pressure reactor, a boiling water reactor and a superheater reactor.

The reactor design also has to take under consideration requirements for the flow of neutrons-reactions and the neutron passing through; also, of course, the heat exchange conditions have to be considered. Finally, unavoidable corrosion has also to be considered.

The neutron rays from the fuel rods prescribe primarily the various types of material to be used and the spatial distribution thereof.

The heat exchange techniques require the consideration of the least efficient aggregate state of the water which is the superheated vapor thereof, and, of course, the heat exchange process also determines the spatial arrangement of the cooling channels 32.

The consideration of any possible corrosion requires a very narrow range of material from which one can select.

It is therefore readily apparent that the sum of all the requirements lead to a compromise whereby optimum conditions can be obtained under the circumstances as far as economy, simplicity and security of operation is concerned.

The FIGS. 2 and 3 indicate in what way the conditions as outlined above can be achieved. These figures, as stated above, show in detail one particular fuel element. There is first shown an outer casing 26 corresponding to tube 33 in FIG. 1. Inside of this casing 26 are positioned altogether seven fuel rods 21 forming a lattice type arrangement. These fuel rods 21, for example, have a core which is enriched uranium dioxide. The core of each rod 21 is encased by a cover of stainless steel which is a corrosion proof material. Each fuel rod, for example, has a diameter of about 10 millimeter, outer diameter.

There is provided a body or supporting member 23, made for example of ceramic, for example $Al_2O_3$ and receiving all seven fuel rods. Between each rod and its receiving bore in member 23 is a ring shaped gap 22. The ceramic member 23 is particularly characterized in being highly temperature and water resistant on one hand and it adsorbs only very few neutrons on the other hand.

In order to achieve maximum efficient heat exchange at a lowest possible pressure loss the cooling medium has to pass through the ring shaped gaps 22 in a uniform manner.

These ring shaped gaps 22 correspond to the channels 32 in FIG. 1, and they have a width of about 1 mm.

In order to properly position each fuel rod 21 in its receiving bore so that the ring gap 22 has a uniform diameter, there are positioned spacers 24 in form of small balls, and they are placed along the rods (transversely to the plane of the drawing) in similar groups, each group consisting of three spacers, such as shown, and each group is displaced from the next group in longitudinal direction (perpendicular to the plane of the drawing) at a distance of 200 millimeters. These small balls preferably are also made of ceramic, or, if there is any danger of any local overheating of the steel casing at the connection point, thin sheet metal pieces can be used.

There arises the problem in that the ceramic member 23 is very difficult to manufacture with the necessary accuracy. Therefore, the member 23 will not be made originally as one structural unit, but it will be composed of several single members (see FIG. 3). There are provided holes 25 which are aligned in adjacent pieces then forming member 23, and these holes 25 receive bolts for interconnecting adjacent pieces, such as 23' and 23'', in longitudinal direction. Preferably the bolts have a smaller thermal expansion coefficient than the ceramic material of which member 23 is made so that during operation the various elements are rigidly pressed together, and member 23 becomes a unit supporting the rods firmly during reactor operation.

As said above, the casing 26 surrounds the member 23 which casing can be considered as having a somehow deformed hexagonal configuration with indented lateral portions in order to reduce the amount of unnecessary filling material of ceramic member 23. This is of great advantage as far as the exchange process neutrons-moderator is concerned. The particular outer configuration of member 23 can be considered as being provided with longitudinally extending ribs of low height so that a uniform but very small space 26' remains between the outer casings 26 and the ceramic member 23. Cooling fluid can pass into this space 26'. However, ceramic member 23 is to be secured to the reactor plate such as plate 4 in FIG. 1; consequently space 26' is blocked off at the upper portion (taken with respect to FIG. 3) of the entire construction so that, considering again FIG. 1, the fluid therein cannot pass into the dome chamber 5.

There will of course appear a certain amount of stagnating water vapor in space 26'; this is a very advantageous feature because this particular water vapor becomes a cushion serving as an additional thermal insulation of the entire fuel rod structure and the moderator space 8.

The casing 26 is preferably made of zirconium and serves for the protection of this ceramic filling member 23, and it serves also as a mechanical support of the single parts this ceramic member is made of as outlined above.

The fuel rods are preferably not sub-divided as stated. In case the fuel rods have to be exchanged, the entire member 23 is taken out of the casing 26 and then the single rods such as 21 are taken out of the member 23 and new ones are inserted as fuel renewal.

As it can be seen from FIG. 2, the various fuel elements are arranged in groups of seven each, and everyone of such groups is placed in an exploded honey-comb type arrangement in moderator space 8.

After having described the various features of the present invention, the advantages of all the arrangements as disclosed shall be summarized.

There is first a very efficient heat exchange at the lowest possible pressure loss in the very accurately predetermined gaps or channels such as 22 in FIG. 2 and FIG. 3 or 32 in FIG. 1.

The filling material, ceramic, as suggested and used is a corrosion and temperature proof material with a low neutron absorption rate.

There is a very good thermal insulation of the superheated vapor in the channels 22 or 32 as compared with the fuel in moderator space 8.

The overall construction is very simple in view of self-regulating pressure operating conditions as outlined above.

The narrow cooling channels 22, 32 themselves, taken altogether define a very small volume so that variations in the density of the moderator-cooling medium when passing through the channel 32 as compared with the density-weight of the moderator-cooling medium in the moderator space 8 is hardly recognizable.

There are no difficulties as far as neutron physics are concerned, because there are no vapor bubbles in the moderator space, which is sufficiently thermally insulated from channels 22, 32 as compared with the bubbles in a boiling water reactor of the prior art as mentioned above; the moderator in the instant case does not boil. In case the cooling channels such as 32 and 22 are flooded for cleaning purposes, no undue increase in nuclear reaction is produced because of this small volume taken up by these channels.

One can use elongated fuel rods the outer casing of which being preferably polished so that no corrosion or hardly any corrosion will take place.

The invention is not limited to the embodiments described above but all changes and modifications thereof not constituting department from the spirit and scope of the invention are intended to be covered by the following claims.

What is claimed is:

1. A nuclear reactor structure for producing superheated steam and comprising; an outer pressure vessel, a plate in said outer pressure vessel intermediate the top and bottom thereof, a dome mounted on said plate and forming an inner pressure vessel, tubular elements connected with said plate and communicating through the plate with said inner pressure vessel and extending downwardly from the plate in the outer pressure vessel, fuel rods disposed in said tubular elements and substantially restricting the space within said tubular elements for fluid flow therein, means for maintaining a water level in said outer pressure vessel above the top of the inner pressure vessel but below the top of the outer pressure vessel whereby water will flow upwardly through said tubular elements toward said inner pressure vessel, the restriction to fluid flow through said tubular elements being such that water flowing upwardly therethrough is converted into steam before it reaches the upper ends of the tubular elements and is superheated by the time it emerges from the tubular elements into said inner pressure chamber, and means for drawing superheated steam from said inner chamber for operating a turbine or the like.

2. The arrangement according to claim 1 in which a cylinder is provided inside the outer pressure vessel and in surrounding relation to said tubular elements and in radially spaced relation to both the tubular elements and said outer pressure vessel, and said means for maintaining water in said outer pressure vessel comprising a ring-like conduit means positioned at the upper end of said cylinder and operable to supply make up water between said cylinder and the outer pressure vessel and in the downward direction thereby to maintain the water in the outer pressure vessel in circulation.

3. The arrangement according to claim 2 in which means are provided for controlling the pressure in the upper end of the outer pressure vessel above the water level therein thereby to control the pressure difference between the upper end of the outer pressure vessel and the pressure in the inner vessel thereby to regulate the rate of water flow upwardly in said tubular elements.

4. The arrangement according to claim 3 in which said tubular elements comprise parallel tubular bores in a heat insulating supporting member, and said fuel rods are circular in cross section and extend axially along the said bores.

5. The arrangement according to claim 4 in which said rods extend over the entire length of said supporting member.

6. The arrangement according to claim 5 in which control rod means are provided movable axially relative to said fuel rods, and means sensitive to the temperature of the stream being drawn from said inner pressure vessel for operating said control rods.

References Cited by the Examiner

UNITED STATES PATENTS

| 2,890,158 | 6/59 | Ohlinger et al. | 176—32 |
|---|---|---|---|
| 2,898,280 | 8/59 | Schultz | 176—78 |
| 2,949,414 | 8/60 | Ransohoff et al. | 60—108 |
| 2,985,575 | 5/61 | Dennis et al. | 176—43 |
| 3,034,975 | 5/62 | Beurtheret | 176—56 |
| 3,036,965 | 5/62 | Braun | 176—56 |
| 3,085,959 | 4/63 | Germer | 176—59 |

FOREIGN PATENTS

| 1,167,334 | 2/56 | France. |
| 1,238,871 | 7/60 | France. |
| 1,248,367 | 10/60 | France. |
| 810,718 | 3/59 | Great Britain. |

OTHER REFERENCES

German printed application 1,021,515, December 1957.

CARL D. QUARFORTH, *Primary Examiner.*

REUBEN EPSTEIN, *Examiner.*